UNITED STATES PATENT OFFICE.

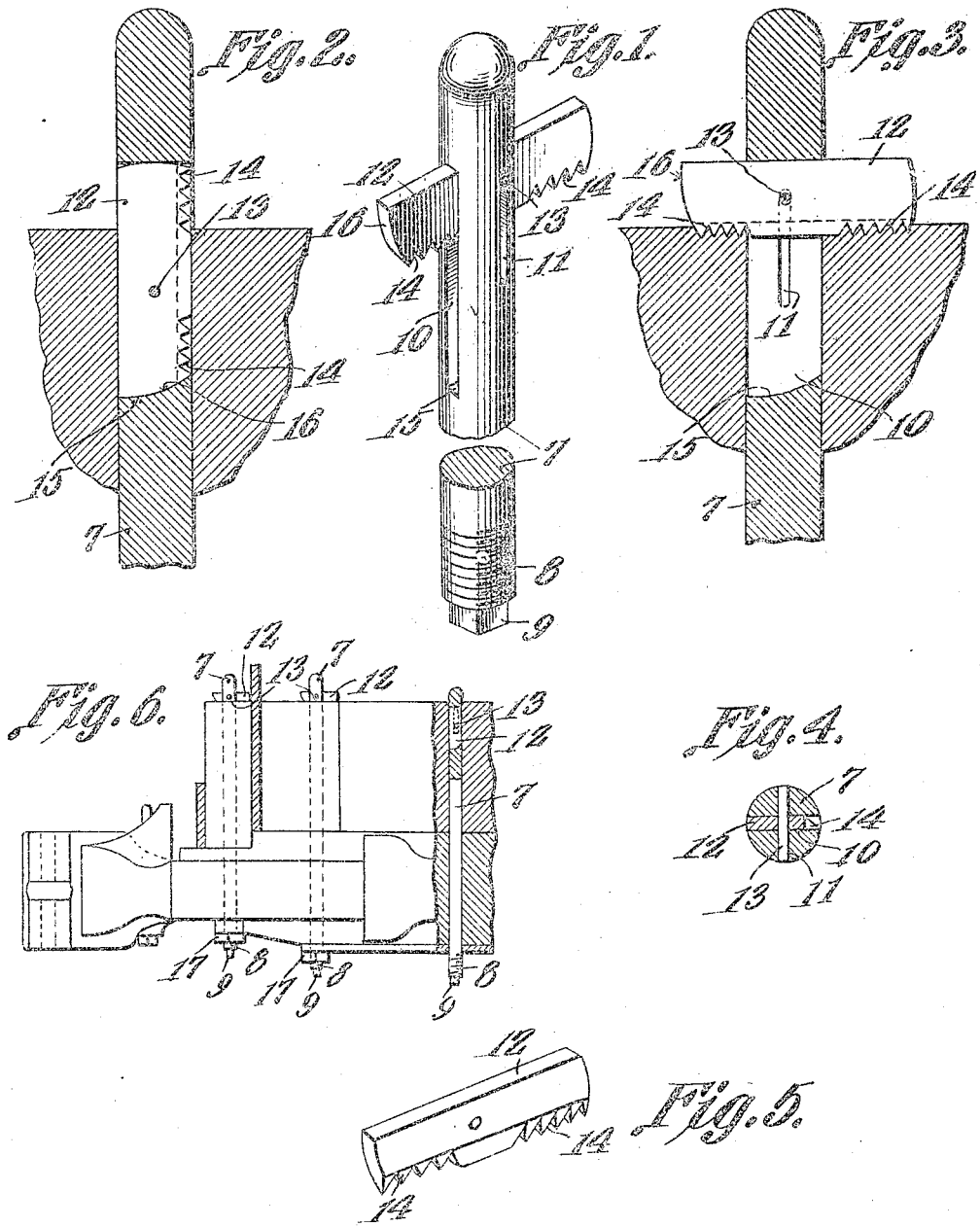

ALBERT E. BURRIDGE, OF HUMMELSTOWN, PENNSYLVANIA.

HEADLESS BOLT.

1,075,759.

Specification of Letters Patent.   Patented Oct. 14, 1913.

Application filed August 7, 1912. Serial No. 713,830.

*To all whom it may concern:*

Be it known that I, ALBERT E. BURRIDGE, a citizen of the United States, residing at Hummelstown, in the county of Dauphin and State of Pennsylvania, have invented a new and useful Headless Bolt, of which the following is a specification.

The present invention relates to bolts, and aims to provide an improved headless bolt embodying means at the end which is usually headed so that the said end may be inserted through the bolt hole in an object and operable to engage the object so as to prevent the withdrawal of the bolt, in order that the bolt may be employed in the usual capacity of a securing member.

It is also the object of the present invention to provide a bolt of the character indicated which shall be simple, substantial, durable, compact and inexpensive in construction, as well as convenient, serviceable, and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawings, wherein like reference characters have been employed to denote corresponding parts, and wherein—

Figure 1 is a perspective view of a bolt constructed in accordance with the present invention, parts being broken away. Fig. 2 is a longitudinal sectional view thereof, showing the bolt being passed through an object. Fig. 3 is a view similar to Fig. 2 after the end of the bolt has been passed through the object and locked against withdrawal. Fig. 4 is a transverse section of the bolt. Fig. 5 is a perspective view of the locking member. Fig. 6 is a side elevation of an arbitrary structure showing a plurality of the present bolts applied thereto, parts being broken away.

Referring specifically to the drawings, the bolt has been designated by the numeral 7, the same being of any desired length and diameter, and being provided at one end with the screw threads 8 and with a reduced extension 9 which is square or non-circular in contour. The extension 9 facilitates driving the bolt through an object without injuring the screw threads, and also permits the bolt to be rotated by a wrench or other device, when desired. The other end of the bolt is rounded in order to convenience the insertion of the said end in the bolt hole, the said end not being provided with the usual head so that the said end may be inserted into the bolt hole and pushed therethrough. Adjacent the latter end of the bolt, the bolt is provided with a longitudinally elongated opening 10 therethrough and is provided with longitudinal slots 11 at the sides of the opening 10. This opening 10 is of such dimensions as to not materially weaken the bolt, and the slots 11 are also as small as possible so as not to render the bolt unnecessarily weak.

A locking lever 12 which is preferably in the form of a short bar of metal is disposed in the opening 10 and has a fulcrum pin 13 passing through same at a point nearer one end than the other end, the ends of the pin 13 working in the respective slots 11. One arm of the locking lever 12 is therefore shorter than the other so that the lever is pivoted eccentrically and is heavier at one end than the other, or is overbalanced at one end. One edge of the lever 12 is serrated as designated by the numeral 14, all of the teeth projecting in one direction, the edge which is serrated being designed to swing inward when the locking lever is swung from within the opening 10 to a position at right angles to the axis of the bolt. In order to prevent the locking lever 12 from swinging in the wrong direction, the inner end 15 of the opening 10 has been curved or cut diagonally and the end 16 of the short arm of the lever has been correspondingly curved or cut, so that when lever 12 is swung within the opening 10, the curved or diagonal portions will coöperate to permit the lever to swing open in one direction only. The slots 11 are of sufficient length in order that when the lever 12 is swung at right angles to the axis of the bolt, the lever is adapted to seat against the outer end of the opening 10 so as to relieve the fulcrum pin 13 of any shearing strain, the outer end of the opening being flat and arranged at right angles to the axis of the bolt. The fulcrum of the lever 12 is also made slidable within the opening 10 so that the lever 12 may be swung into and housed within the opening 10.

This bolt is adapted particularly for securing bolsters and other parts to the bottom of car bodies, so that the bolts need not be inserted through the car bottom and bolster in one direction, or from the inside or outside, to necessitate the engaging of the nut from the other side. This is necessary with the ordinary bolt, and has been found inconvenient and in many cases impossible, due to interfering parts. With the present bolt, however, the bolt may be inserted upward through the bolt hole or holes, the locking lever 12 having been previously housed within the compass of the bolt with the heavier arm thereof upward. When the corresponding end of the bolt has been passed through the object or objects to be secured together, the lever 12 will swing by gravity out of the opening 10 and at right angles to the axis of the bolt so that the teeth 14 project inwardly. The lever 12 is thus swung to a position so that when the bolt is drawn backward slightly, the teeth 14 will engage the corresponding object so that the lever will prevent the further withdrawal of the bolt, and the usual nut 17 may be screw threaded on the lower or screw threaded end of the bolt in the usual fashion, the teeth 14 in engaging the object preventing the rotation of the bolt. The teeth 14 in projecting in the same direction will prevent the rotation of the bolt in either direction, and the fulcrum pin 13 being slidable in the slots 11 will permit the outer end of the opening 10 to be drawn against the lever 12 so that the pin 13 is relieved of any shearing strain, as above indicated.

It will be noted that the pin 13 lies in the median line of the bar between its edges and is arranged closer to the lower end of the bar than the upper end, the shortest edge of the bar, provided by the inner or lower diagonal end thereof, being beveled throughout and serrated adjoining the ends of the bar. Thus, that side of the bar between the longitudinal median line and the longest or straight edge is heavier than the other side, or that side between the median line and the serrated or toothed edge; and as a consequence, when the bar or lever is swung upright within the opening in the bolt, the weight of the heavier side will overbalance the weight of the lighter side and the bar will tend to maintain its position within the bolt. This tendency of the bar to maintain its position within the bolt, however, is not detrimental, for the reason that when the bolt is driven through an object by means of a hammer, sledge or the like, the jar will cause the bar to swing open properly.

The above feature is of advantage for the reason that should it be required, either during the insertion or withdrawal of the bolt, to position the bar within the bolt, this may be readily accomplished without fear of the bar swinging outwardly unless the bolt is jarred.

Another important feature of the present invention resides in the fact that the shortest edge of the bar is beveled and toothed adjoining the ends of the bar, the beveled portions facing in the same direction, in order that when the bar is swung open, the beveled and toothed or serrated edge portions will engage the object. Thus, when the bolt is tightened, the beveled and toothed edge will take into or bite the object in a novel manner, the bevel serving to bind the bolt by forcing the same laterally slightly, as will be apparent. It will also be noted that when the bolt is given a torsional strain, one way or the other, one end of the bar will tend to rise, thus depressing the other end farther into the object, so that there will be no liability for the bar to swing upon the object or to permit the bolt to rotate. The last mentioned function is accomplished for the reason that the beveled portions are similarly disposed, or face in the same direction, so that when the edges of the bar are embedded within the object, as illustrated in Fig. 3, the beveled portions will engage the object, and when the bolt is given a rotating tendency in either direction, one or the other of the bevels will tend to rise onto the surface of the object, and as a consequence, the other end of the bar 12 will be swung deeper into the object.

From the foregoing, taken in connection with the drawings, the capabilities and advantages of the present device will be apparent, and it will be observed that the objects aimed at are carried out in a satisfactory manner.

What is claimed is:—

1. In combination with a bolt having a longitudinal opening at one end and longitudinal slots at the sides of the opening, a bar fitting in the opening, and a pin carried by the bar and terminally engaging in said slots, one end of the bar being overbalanced, the bar and bolt having coöperating portions for constraining the bar to swing open in one direction, that edge of the bar which swings innermost being beveled and toothed adjoining the ends of the bar, the beveled portions facing in the same direction, as and for the purpose described.

2. The combination of a vertical bolt having a longitudinal opening at its upper end and longitudinal slots at the sides of the opening, the upper end of the opening being flat and arranged at right angles to the axis of the bolt and the lower end of the opening being diagonal, a bar fitting in the opening, and a pin carried by the bar nearer its lower end than its upper end and ter inally engaging in the slots, the upper end of the bar being curved about the pin as a center to lie snugly under the upper end of the opening and the lower end of the bar being diagonal to seat on the lower end of the opening, the shortest edge of the bar being beveled and toothed adjoining the ends of the bar and the longest edge being straight and designed to seat against the upper end of the opening, the beveled portions facing in the same direction.

In testimony that I claim the foregoing as my own, I have hereto affixed my signature in the presence of two witnesses.

ALBERT E. BURRIDGE.

Witnesses:
   A. D. HOOVER,
   CLAYTON HABBYSHAW.